United States Patent
Vincze et al.

(10) Patent No.: US 9,802,473 B2
(45) Date of Patent: Oct. 31, 2017

(54) GRILL ASSEMBLY

(71) Applicant: Caterpillar Inc., Peoria, IL (US)

(72) Inventors: Andras-Ede Vincze, Wackerdorf (DE); Sven Voss, Regensburg (DE)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/119,647

(22) PCT Filed: Mar. 2, 2015

(86) PCT No.: PCT/US2015/018332
§ 371 (c)(1),
(2) Date: Aug. 17, 2016

(87) PCT Pub. No.: WO2015/142508
PCT Pub. Date: Sep. 24, 2015

(65) Prior Publication Data
US 2017/0008387 A1  Jan. 12, 2017

(30) Foreign Application Priority Data
Mar. 17, 2014 (GB) .................... 1404685.8

(51) Int. Cl.
*B60K 1/04* (2006.01)
*B60K 11/08* (2006.01)
(Continued)

(52) U.S. Cl.
CPC .......... *B60K 11/08* (2013.01); *B01D 46/0075* (2013.01); *B01D 46/10* (2013.01); *B60Y 2200/412* (2013.01)

(58) Field of Classification Search
CPC ... B60K 1/04; F01P 2011/063; A01D 41/1252
See application file for complete search history.

(56) References Cited

U.S. PATENT DOCUMENTS

| 6,321,830 B1 | 11/2001 | Steinmann |
| 7,878,171 B2 | 2/2011 | Vandike et al. |
| (Continued) | | |

FOREIGN PATENT DOCUMENTS

| CN | 201195083 Y | 2/2009 |
| DE | 19822197 A1 | 12/1999 |
| (Continued) | | |

OTHER PUBLICATIONS

International Search Report for related International Application No. PCT/US2015/018332; report dated May 26, 2015.
(Continued)

*Primary Examiner* — Bryan Evans

(57) ABSTRACT

A grill assembly is disclosed. The grill assembly includes an air inlet screen. The air inlet screen is configured to allow passage of air therethrough. The grill assembly also includes a base frame. The base frame is attached to the air inlet screen. The grill assembly further includes a plurality of trusses. The plurality of trusses is connected to the base frame. The grill assembly includes a motor affixed to the trusses. The motor is configured to mechanically vibrate the trusses. Further, the trusses are arranged in a manner such that the air inlet screen is configured to vibrate during an operation of the motor.

20 Claims, 3 Drawing Sheets

(51) Int. Cl.
   *B01D 46/00*     (2006.01)
   *B01D 46/10*     (2006.01)

(56)         References Cited

U.S. PATENT DOCUMENTS 8,651,927 B1 *  2/2014  Roberge ............... A01F 12/444
                                                  460/101
2007/0000219 A1   1/2007  Park et al.
2007/0000221 A1   1/2007  Park et al.
2010/0301638 A1  12/2010  Hinshaw et al.

FOREIGN PATENT DOCUMENTS

DE   202006008719 U1    6/2006
DE   102010037596 A1    3/2012
DE   102012010891 A1   12/2013
DE   202014010049 U1    4/2015
EP        1433639 A1    6/2004
EP        1467073 A1   10/2004
EP        2119389 A2   11/2009
GB        2433220 A     6/2007
JP        55-153815    12/1980
JP        10-148126     6/1998
WO   WO-2012/145587 A1  10/2012

OTHER PUBLICATIONS

Search Report for related GB Application No. 1404685.8; report dated Sep. 4, 2014.

\* cited by examiner

GRILL ASSEMBLY

CROSS-REFERENCE TO RELATED APPLICATION

This Application is a 35USC §371US National Stage filing of International Application No. PCT/US2015/018332 filed on Mar. 2, 2015, and claims priority under the Paris Convention to GB Patent Application No. 1404685.8filed on Mar. 17, 2014.

TECHNICAL FIELD

The present disclosure relates to an air inlet provision, and more particularly, to a grill assembly for the air inlet provision.

BACKGROUND

Work machines, for example excavators, generally include an engine as a power source. A cooling system is associated with the engine. The cooling system is configured to maintain a temperature associated with various parts of the engine. The cooling system may include a coolant flowing therethrough. The coolant may be cooled by airflow. For this purpose, an air inlet screen is provided on the body of the machine in order to allow an inflow of air from the surroundings.

U.S. Published Patent Application 2010/0301638 discloses an engine air intake system which is formed by an engine compartment. A fan and a grille screen are used to remove a portion of debris from air external to the vehicle. After the air is partially cleaned via the grille screen, it moves toward a heat exchanger carrying a portion of the remaining debris with it. A portion of the debris may fall out of the air via gravitational effects. A portion of the air then moves up and into an entrance passage for an air intake duct that is integrated with the hood of the engine enclosure, this portion having been further cleaned via debris passage to and through the heat exchanger as well as gravitational effects. The air then travels through the air intake duct and passes through an air filter where a portion of the remaining debris is removed prior to the air being supplied to the engine intake.

SUMMARY OF THE DISCLOSURE

In one aspect of the present disclosure, a grill assembly is disclosed. The grill assembly includes an air inlet screen. The air inlet screen is configured to allow passage of air therethrough. The grill assembly also includes a base frame. The base frame is attached to the air inlet screen. The grill assembly further includes a plurality of trusses. The plurality of trusses is connected to the base frame. The grill assembly includes a motor affixed to the trusses. The motor is configured to mechanically vibrate the trusses. Further, the trusses are arranged in a manner such that the air inlet screen is configured to vibrate during an operation of the motor.

In another aspect, a machine is disclosed. The machine includes a power source and a frame. The machine also includes a body. The machine further includes a grill assembly attached to the body. The grill assembly includes an air inlet screen. The air inlet screen is configured to allow passage of air into the body. The grill assembly also includes a base frame. The base frame is attached to the air inlet screen. The grill assembly further includes a plurality of trusses. The plurality of trusses is connected to the base frame. The grill assembly includes a motor affixed to the trusses. The motor is configured to mechanically vibrate the trusses. Further, the trusses are arranged in a manner such that the air inlet screen is configured to vibrate during an operation of the motor.

Other features and aspects of this disclosure will be apparent from the following description and the accompanying drawings.

DETAILED DESCRIPTION

Figure 1:
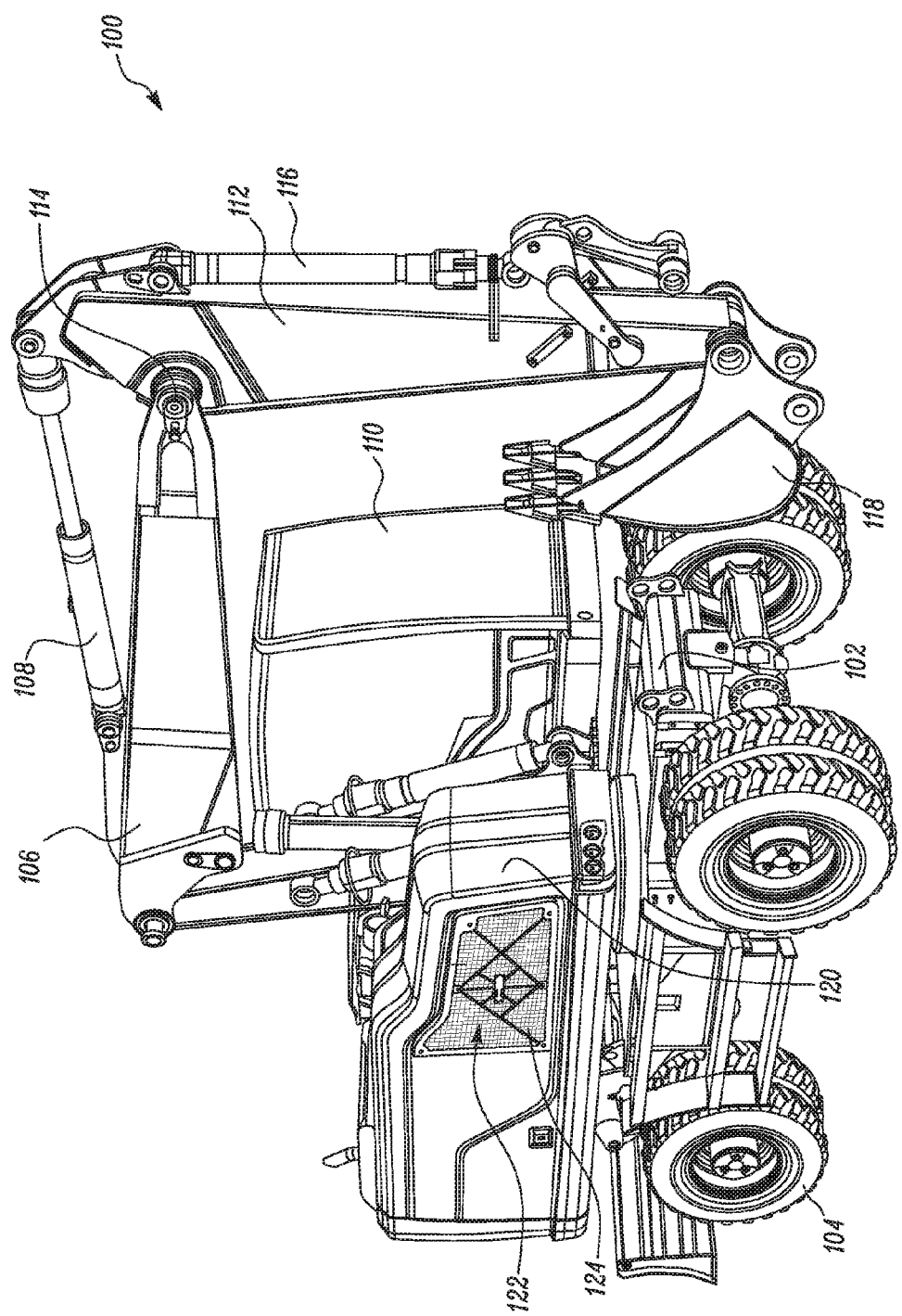
FIG. 1 is a perspective view of an exemplary work machine, according to one embodiment of the present disclosure.

Wherever possible, the same reference numbers will be used throughout the drawings to refer to the same or the like parts. FIG. 1 illustrates an exemplary machine 100, according to one embodiment of the present disclosure. In one embodiment, the machine 100 may embody an excavator. It should be noted that although the machine 100 described herein is the excavator, the machine 100 may alternatively include any other machine, such as, a back hoe loader, a shovel, or any other construction machines that are known in the art.

As shown in FIG. 1, the machine 100 includes a frame 102. The machine 100 also includes a power source (not shown), a transmission system (not shown), and a propulsion system (not shown) mounted on the frame 102 of the machine 100. In one embodiment, the power source is an engine. The engine may include, for example, a diesel engine, a gasoline engine, a gaseous fuel powered engine such as a natural gas engine, a combination of known sources of power or any other type of engine apparent to one of skill in the art. The transmission system is communicably coupled to the power source. The transmission system may include coupling elements for transmitting a drive torque from the power source to the propulsion system. As illustrated in FIG. 1, the propulsion system may include ground engaging elements for example, wheels 104 configured to propel the machine 100 on a ground.

Further, the machine 100 may include a linkage member such as a boom 106 which is pivotally mounted on the frame 102. The boom 106 may extend outwards. A hydraulic cylinder 108 is coupled to the boom 106. The hydraulic cylinder 108 is used to operate the boom 106 based on an operator command The operator may be seated within an operator cabin 110 of the machine 100.

Also, a stick 112 may be pivotally mounted at a pivot point 114 to an outer end of the boom 106. During operation of the machine 100, a hydraulic cylinder 116 may be used to move the stick 112 relative to the boom 106 about the pivot point 114. Further, a bucket 118 may be pivotally mounted at a pivot point to an outer end of the stick 112. A hydraulic cylinder is used to move the bucket 118 relative to the stick 112 about the pivot point.

The machine 100 includes a body 120. The engine is mounted within the body 120 of the machine 100. The engine includes a cooling package (not shown) associated therewith. The cooling package is provided within the body 120. The cooling package includes a coolant flowing therethrough. The coolant is configured to flow through various parts of the engine for the purpose of heat exchange.

The coolant flowing through the cooling package may exchange heat with a fluid, for example, an airflow entering into the body 120. In the illustrated embodiment, the body 120 includes an opening 122. The opening 122 is provided for ingress of the airflow into the body 120. The opening 122 includes an air inlet screen 124 attached thereon. The air inlet screen 124 may include a mesh. Apertures present on the mesh are configured to allow passage of the airflow into the body 120. The air inlet screen 124 may be made of any metal or polymer known in the art. A shape of the air inlet screen 124 may vary based on the opening 122 of the body 120 on which the air inlet screen 124 fits onto. For example, the air inlet screen 124 may have a rectangular shape.

In some situations, the airflow entering into the body 120 may include debris or particulate matter therein. The debris or the particulate matter having a size larger than that of the apertures present on the air inlet screen 124 may collect on the air inlet screen 124. This collection of the debris may in turn lead to partial or complete blockage of the air inlet screen 124 and also obstruct the airflow entering into the body 120 via the air inlet screen 124. Due to the restriction in the airflow entering into the body 120, an overall cooling capacity of the coolant may be affected, sometimes leading to undesired heating of the engine and/or the components associated with the engine.

Figure 2:
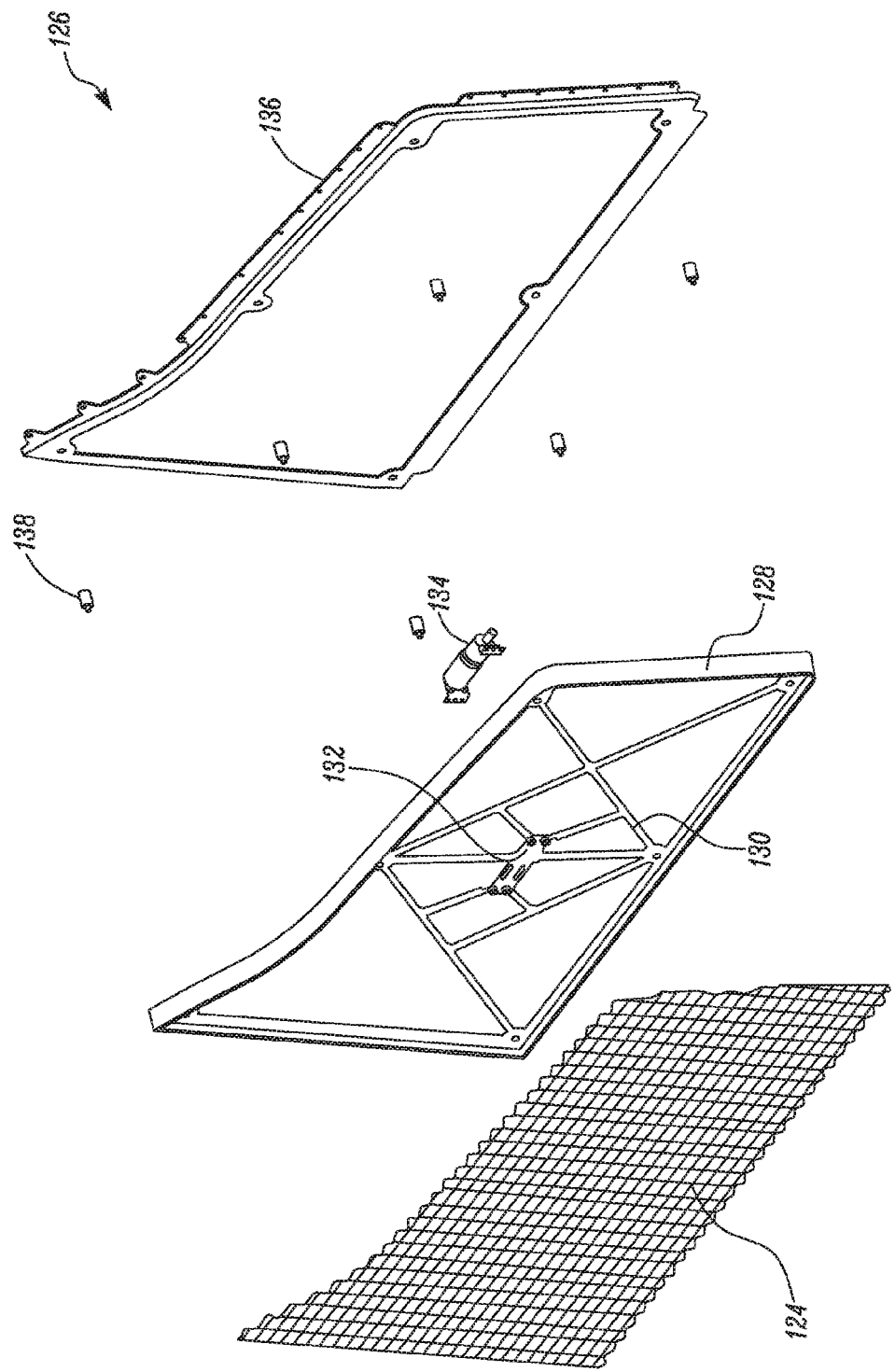
FIG. 2 is an exploded view of an exemplary grill assembly for the machine.

A grill assembly 126 is attached to the machine 100. FIG. 2 illustrates an exploded view of the grill assembly 126. The grill assembly 126 includes the air inlet screen 124, a base frame 128 and trusses 130. The base frame 128 is provided on an interior facing side of the body 120 or an interior facing portion of the air inlet screen 124. The base frame 128 is disposed along a perimeter of the air inlet screen 124. Parameters related to the base frame 128 such as, shape, size and other dimensions may vary based on a cross sectional area of the air inlet screen 124. In the illustrated embodiment, the base frame 128 has a substantially rectangular configuration.

The trusses 130 are connected to the base frame 128. The trusses 130 may be connected to the base frame 128 using any mechanical fastening means known in the art. For example, the trusses 130 may be welded or bolted to the base frame 128. Alternatively the trusses 130 may be integral with the base frame 128 to form a single piece design. The trusses 130 are provided within an area enclosed by a boundary defined by the base frame 128, such that the trusses 130 extend within the defined area and are attached to various points of the base frame 128. The trusses 130 are also provided on an interior facing side of the body 120. Further, the trusses 130 are provided such that the trusses 130 are configured to contact with the air inlet screen 124. The trusses 130 may be embodied as bars having a circular, rectangular or square cross-section. Thickness and length of each of the trusses 130 may vary.

A support tab 132 may be connected to the trusses 130 in order to accommodate a motor 134 thereon. This support tab 132 may form a part of the truss structure, such that the support tab 132 provides a surface on which the motor 134 may be attached. The motor 134 is attached to the support tab 132 using known fastening means such as, bolting, riveting, screwing and the like. The support tab 132 may be present at a center of the area defined by the base frame 128.

On actuation, the motor 134 is configured to mechanically vibrate the trusses 130. These mechanical vibrations are transmitted to the air inlet screen 124, thereby causing the debris accumulated on the air inlet screen 124 to be dislodged therefrom.

The arrangement of the trusses 130 within the defined area may be symmetrical or asymmetrical. The number of trusses 130 and the positioning within the defined area is based on the cross sectional area and/or the shape of the air inlet screen 124. The trusses 130 are arranged such that on the actuation of the motor 134, the trusses 130 may vibrate. Further, these vibrations may be transmitted to different portions of the air inlet screen 124, thereby causing the debris lodged on the air inlet screen 124 to be shaken off. The motor 134 may be any type of an electric motor, hydraulic motor, pneumatic motor, and the like. In the illustrated embodiment, the motor 134 is an electric motor.

Figure 3:
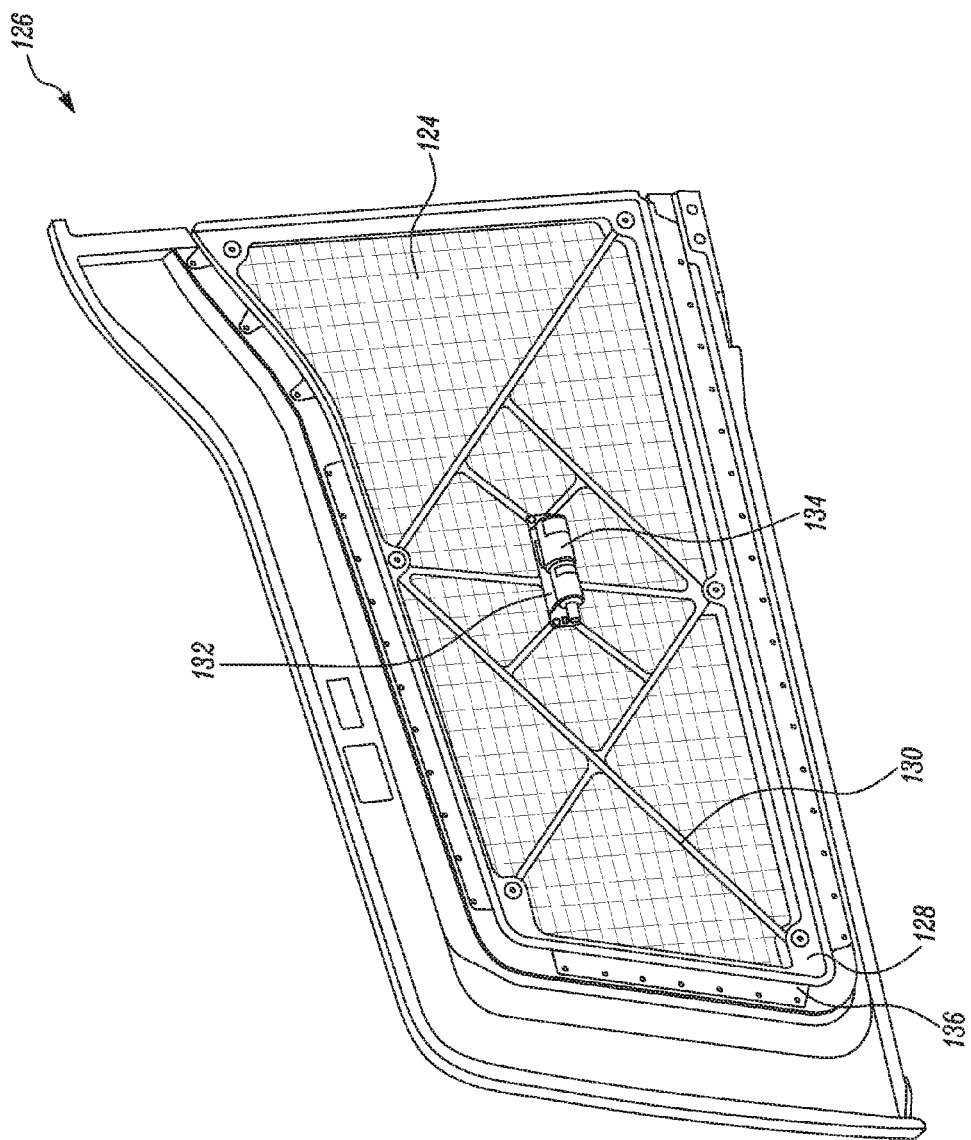
FIG. 3 is a perspective view of the grill assembly of FIG. 2 when assembled.

Further, the grill assembly 126 also includes a support frame 136. The support frame 136 is configured to be attached to the body 120. The support frame 136 may be attached to the body 120 using any mechanical fastening means known in the art. Referring to FIG. 3, the support frame 136 may be bolted to the interior side of the opening 122 of the body 120.

The support frame 136 may be disposed along the perimeter of the air inlet screen 124. Mounting members 138 may be disposed between the support frame 136 and the base frame 128. The mounting members 138 may be made of rubber. These mounting members 138 are configured to isolate or reduce the mechanical vibrations, caused by the motor 134, from reaching other parts of the body 120.

The trusses 130, base frame 128 and the support frame 136 of the grill assembly 126 may be made of any metal or polymer known in the art. The materials used for the trusses 130, base frame 128 and the support frame 136 are chosen such that the material does not deform due to the mechanical vibrations caused by the motor 134.

INDUSTRIAL APPLICABILITY

The present disclosure provides the grill assembly 126 for cleaning the air inlet screen 124. The motor 134 which is attached to the grill assembly 126 may be actuated after predetermined intervals of time. Therefore, the machine 100 may be kept in service over longer periods of time so that the machine 100 may continue to operate. The cleaning of the grill assembly 126 may be independent of the operation of the machine 100, and hence the operator is not forced to halt the operation of the machine 100 in order to clean the air inlet screen 124. Further, the cleaning of the air inlet screen 124 is conducted with minimal human intervention, and so the operator may be freed from abandoning the machine 100 for the purpose of cleaning the air inlet screen 124. The motor 134 may be actuated based on the operator command or periodic signals from an onboard controller associated with the motor 134.

The working of the system will now be explained in detail. The motor 134 may be actuated electrically, pneumatically, or hydraulically. In one embodiment, an actuation signal may be sent to the motor 134 by the operator seated within the operator cabin 110. For example, the operator cabin 110 of the machine 100 may include a button for the actuation of the motor 134. In another situation, the actuation signals may be received by the motor 134 by an Electronic Control Unit (ECU) onboard the machine 100. The ECU may be configured to send actuation signals to the motor 134 after predetermined time intervals. Further, the ECU may include an inbuilt interval timer. The interval timer may be configured to store a time interval between two successive events of actuation of the motor 134. In one example, the time intervals may be decided based upon a condition of a worksite on which the machine 100 is operating. The time interval may range between 5 minutes to 60 minutes. In another example, the time interval between two successive events of actuation of the motor 134 may be 20 minutes.

Alternatively, the operation time of the motor 134 may also be saved within the ECU based on system requirements. The ECU may send a signal for de-actuating the motor 134 after a lapse of the operation time.

In one embodiment, the operation of the motor 134 may be synchronized with a start and/or shut down of the engine. During shut down of the engine the ECU may be configured to save a current status of the interval timer. Further, in a successive operation cycle, the interval timer may be configured to start from the status saved during the prior operation cycle. The ECU may be configured to retrieve the current status of the interval timer and accordingly send the actuation signal to the motor 134.

Based on the actuation signal received from the ECU, the motor 134 is configured to vibrate the trusses 130 and the base frame 128 of the grill assembly 126 for a predetermined time period. Contact between the trusses 130 and the air inlet screen 124 may cause the mechanical vibrations to be transmitted from the trusses 130 to the air inlet screen 124. Accordingly, the air inlet screen 124 may vibrate during the operation of the motor 134. This vibration of the air inlet screen 124 in turn may cause the debris collected on the air inlet screen 124 to dislodge therefrom.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A grill assembly comprising:
   an air inlet screen configured to allow passage of air therethrough;
   a base frame attached to the air inlet screen, an inner surface of the base frame defining an interior area of the base frame, the interior area of the base frame being configured to allow passage of the air therethrough;
   a support tab disposed within the interior area of the base frame;
   a plurality of trusses disposed within the interior area of the base frame, each truss of the plurality of trusses being connected to the base frame and the support tab; and
   a motor affixed to the support tab such that the motor is located within the interior area of the base frame, the motor being configured to mechanically vibrate the support tab, and the plurality of trusses being arranged to transfer a vibration of the support tab to the air inlet screen during an operation of the motor.

2. The grill assembly of claim 1 further comprising: a support frame coupled to the base frame.

3. The grill assembly of claim 2 further comprising: a plurality of mounting members disposed between the support frame and the base frame.

4. The grill assembly of claim 3, wherein the plurality of mounting members are made of rubber.

5. The grill assembly of claim 1, wherein the arrangement of the plurality of trusses is based on at least one of a cross sectional area of the air inlet screen and a shape of the air inlet screen.

6. The grill assembly of claim 1, wherein the base frame is disposed along a perimeter of the air inlet screen.

7. The grill assembly of claim 1, wherein the base frame is disposed on a downstream face of the air inlet screen along a direction of the passage of the air through the air inlet screen.

8. The grill assembly of claim 1, wherein the motor is an electric motor.

9. The grill assembly of claim 1, wherein the base frame includes a first side and a second side, the first side opposing the second side across the interior area of the base frame,
   the plurality of trusses includes a first truss and a second truss,
   the first truss extends from the first side of the base frame to the support tab, and
   the second truss extends from the second side of the base frame to the support tab.

10. The grill assembly of claim 9, wherein the base frame includes a third side and a fourth side, the third side extending from the first side to the second side, the fourth side extending from the first side to the second side,
    the first truss is coupled to the first side of the base frame at a first truss node,
    the plurality of trusses further includes a third truss, and
    the third truss is coupled to the first side of the base frame at the first truss node.

11. The grill assembly of claim 10, wherein the plurality of trusses further includes a fourth truss, and
    the fourth truss is coupled to the first side of the base frame at the first truss node.

12. The grill assembly of claim 10, wherein the second truss is coupled to the second side of the base frame at a second truss node,
    the plurality of trusses further includes a fourth truss, and
    the fourth truss is coupled to the second side of the base frame at the second truss node.

13. The grill assembly of claim 12, wherein the plurality of trusses further includes a fifth truss, and
    the fifth truss is coupled to the second side of the base frame at the second truss node.

14. The grill assembly of claim 13, wherein the plurality of trusses further includes a sixth truss, and
    the sixth truss is coupled to the first side of the base frame at the first truss node.

15. The grill assembly of claim 1, wherein the support tab is located at a center of the interior area of the base frame.

16. The grill assembly of claim 1 further comprising a control unit that is operatively coupled to the motor for controlling the operation of the motor by transmission of actuation signals therebetween,
    the control unit being configured to actuate the motor after a first predetermined time duration of the motor not being actuated.

17. The grill assembly of claim 16, wherein the control unit is further configured to actuate the motor for a second predetermined time duration, the second predetermined time duration occurring after the first predetermined time duration.

18. The grill assembly of claim 17 where at least one of the first predetermined time duration and the second predetermined time duration is based on a condition of a worksite in which the grill assembly is located.

19. A machine comprising an engine and a grill assembly, the grill assembly comprising:
- an air inlet screen configured to allow passage of air therethrough from an outside of the machine to the engine;
- a base frame attached to the air inlet screen, an inner surface of the base frame defining an interior area of the base frame, the interior area of the base frame being configured to allow passage of the air therethrough;
- a support tab disposed within the interior area of the base frame;
- a plurality of trusses disposed within the interior area of the base frame, each truss of the plurality of trusses being connected to the base frame and the support tab; and
- a motor affixed to support tab such that the motor is located within the interior area of the base frame, the motor being configured to mechanically vibrate the support tab, and the plurality of trusses being arranged to transfer a vibration of the support tab to the air inlet screen during an operation of the motor.

20. The machine of claim 19, further comprising a control unit that is operatively coupled to the motor for controlling the operation of the motor by transmission of actuation signals therebetween,
- wherein the control unit is configured to synchronize the operation of the motor with at least one of a start of the engine and a shutdown of the engine.

* * * * *